(12) United States Patent
Cozon et al.

(10) Patent No.: US 10,377,609 B2
(45) Date of Patent: Aug. 13, 2019

(54) SYSTEM AND METHODOLOGY FOR ELECTRONIC CARTRIDGE INSERTION AND/OR EXTRACTION

(71) Applicant: Schlumberger Technology Corporation, Sugar Land, TX (US)

(72) Inventors: Jean-baptiste Cozon, Clamart (FR); Gautier Pierre Joseph Court, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 234 days.

(21) Appl. No.: 15/373,812

(22) Filed: Dec. 9, 2016

(65) Prior Publication Data
US 2018/0163513 A1    Jun. 14, 2018

(51) Int. Cl.
| | |
|---|---|
| *B66D 1/28* | (2006.01) |
| *B23P 11/02* | (2006.01) |
| *B23P 19/02* | (2006.01) |
| *E21B 47/01* | (2012.01) |
| *E21B 17/07* | (2006.01) |
| *E21B 19/084* | (2006.01) |

(52) U.S. Cl.
CPC ........... *B66D 1/28* (2013.01); *B23P 11/02* (2013.01); *B23P 19/02* (2013.01); *E21B 17/07* (2013.01); *E21B 19/084* (2013.01); *E21B 47/011* (2013.01)

(58) Field of Classification Search
CPC ......... B23P 11/02; B23P 19/02; B23P 19/022; B23P 19/04; B23P 19/12; Y10T 29/49872; Y10T 29/49945; Y10T 29/53657; Y10T 29/53796; B25B 27/02; B25B 27/28; B66D 1/00; B66D 1/28; B66D 1/60; E21B 47/01–011; E21B 19/084; E21B 17/07
See application file for complete search history.

(56) References Cited

U.S. PATENT DOCUMENTS 7,249,410 B2 *   7/2007  Zettle .................. H02G 1/14
                                                     269/2

* cited by examiner

*Primary Examiner* — Matthew P Travers
(74) *Attorney, Agent, or Firm* — Sara K. M. Hinkley

(57) ABSTRACT

A technique facilitates the insertion and/or extraction of an electronics cartridge with respect to a corresponding cartridge housing which may be used in a downhole tool, such as a logging tool. An insertion tool comprises a frame to which the cartridge housing may be coupled to enable insertion of a corresponding electronics cartridge. The insertion tool comprises a cartridge adapter which may be selectively engaged with the electronics cartridge. Additionally, the insertion tool comprises a cable system which may be mounted on the frame and coupled with the cartridge adapter. When a cable of the cable system is pulled by, for example, a cable winch, the cartridge adapter is moved in a direction which forces the insertion of the electronics cartridge into the corresponding cartridge housing. In some embodiments, the cable may be rerouted in the cable system to enable extraction of the electronics cartridge from the cartridge housing.

17 Claims, 7 Drawing Sheets

SYSTEM AND METHODOLOGY FOR ELECTRONIC CARTRIDGE INSERTION AND/OR EXTRACTION

BACKGROUND

In many hydrocarbon well applications, well logging is used to collect data on formations which may contain reservoirs of hydrocarbon fluids. Well logging tools may be deployed downhole via wireline and operated to perform the well logging operation. A well logging tool may comprise a sonde which contains measurement sensors and an electronics cartridge which contains the telemetry, electronics, and power supplies for obtaining the logging measurements. The electronics cartridge is disposed inside a steel housing and may use elastomer shock absorbers that are compressed when the electronics cartridge is inserted into the steel housing. The insertion (or extraction) force tends to be proportional to the number and geometry of the elastomer shock absorbers and the force can be substantial. Tooling for inserting and extracting the electronics cartridge tends to be very large, expensive, and generally tool specific.

SUMMARY

In general, a system and methodology are provided which facilitate the insertion and/or extraction of an electronics cartridge with respect to a corresponding cartridge housing which may be used in a downhole tool, such as a logging tool. An insertion tool comprises a frame to which the cartridge housing may be coupled to enable insertion of a corresponding electronics cartridge. The insertion tool comprises a cartridge adapter which may be selectively engaged with the electronics cartridge. Additionally, the insertion tool comprises a cable system which may be mounted on the frame and coupled with the cartridge adapter. When a cable of the cable system is pulled by, for example, a cable winch, the cartridge adapter is moved in a direction which forces the insertion of the electronics cartridge into the corresponding cartridge housing. In some embodiments, the cable may be rerouted in the cable system to enable extraction of the electronics cartridge from the cartridge housing.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology which facilitate the insertion and/or extraction of an electronics cartridge with respect to a corresponding cartridge housing. The cartridge housing may be constructed for use in a downhole tool, such as a logging tool. A variety of downhole tools have an electronic cartridge which may be inserted into a corresponding tubular, pressure tight housing for use in many types of well applications.

Such electronic cartridges often comprise shock absorbers, e.g. elastomer shock absorbers, that are compressed as the electronics cartridge is inserted into the corresponding cartridge housing. The insertion (or extraction) force can be substantial and often is proportional to the number and geometry of the shock absorbers. For example, the greater the number of shock absorbers positioned on the electronics cartridge the greater the force involved during insertion or extraction of the electronics cartridge with respect to the corresponding cartridge housing. The system and methodology described herein provide a space efficient and easy to use tool which facilitates the insertion and/or extraction of the electronics cartridge with respect to the corresponding cartridge housing.

In some embodiments, the tool may be operated to insert (or extract) the electronics cartridge and then removed without disassembly of the tool. The insertion/extraction tool may be used for the insertion and/or extraction of electronics cartridges in standard 1 and 11/16 inch tools, e.g. wireline tools, however it is readily adapted to tools and electronics cartridges of different sizes. Appropriately configured embodiments of the insertion/extraction tool also may be used for inserting and/or extracting electronics cartridges employed in a variety of applications, including wireline applications, testing applications, and/or completion applications with various well tools utilized in such applications.

According to an embodiment, an insertion tool comprises a frame to which a cartridge housing may be coupled to enable insertion of a corresponding electronics cartridge. The insertion tool comprises a cartridge adapter which may be selectively engaged with the electronics cartridge. In this embodiment, the insertion tool comprises a cable system which may be mounted on the frame and coupled with the cartridge adapter. When a cable of the cable system is pulled by, for example, a cable winch, the cartridge adapter is moved in a direction which forces insertion of the electronics cartridge into the corresponding cartridge housing. In some embodiments, the cable may be selectively rerouted in the cable system to enable extraction of the electronics cartridge from the cartridge housing.

Figure 1:
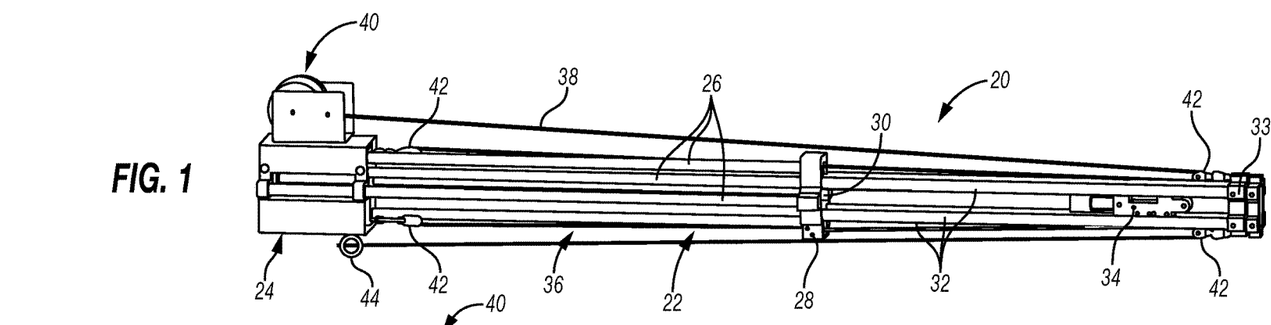
FIG. 1 is an illustration of an example of an insertion/extraction tool, according to an embodiment of the disclosure.
Figures 2, 3:
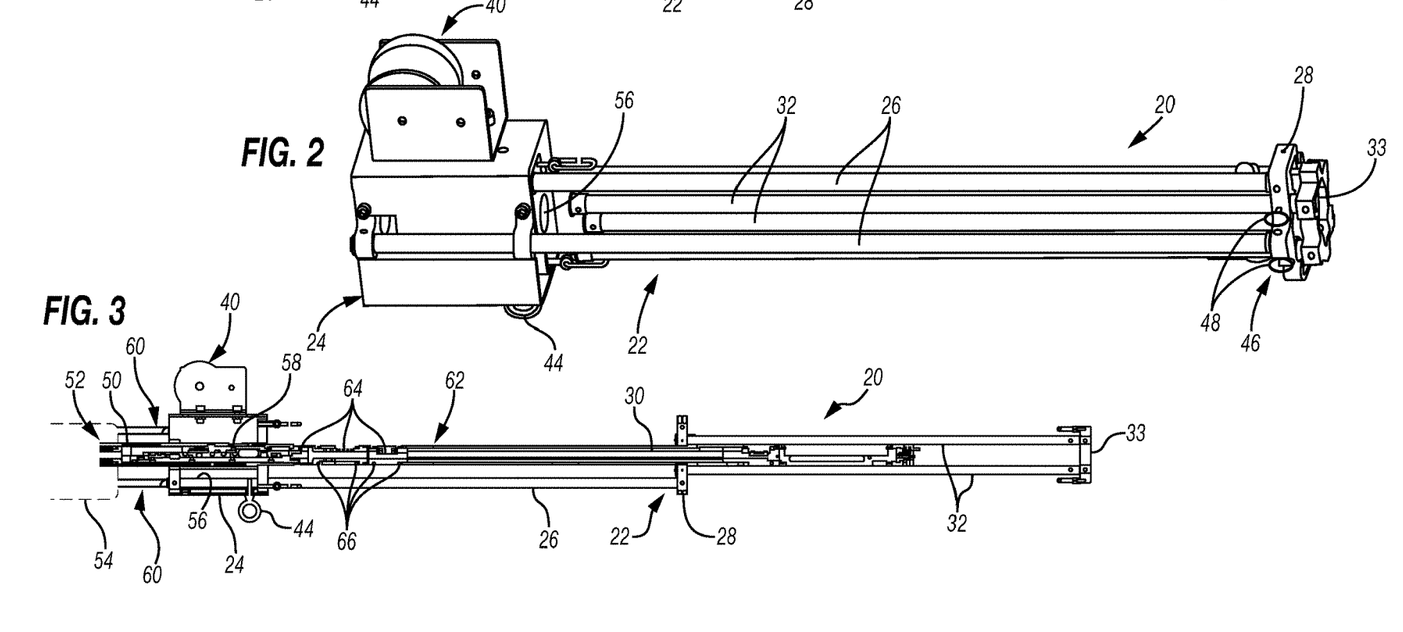
FIG. 2 is an illustration of the insertion/extraction tool illustrated in FIG. 1 but in a collapsed or transport configuration, according to an embodiment of the disclosure.
FIG. 3 is a cross-sectional illustration of the insertion/extraction tool positioned to insert an electronics cartridge into a corresponding housing, e.g. a pressure tight housing, according to an embodiment of the disclosure.

Referring generally to FIG. 1, an embodiment of a tool 20 for insertion and/or extraction of electronics cartridges is illustrated. In this embodiment, the tool 20 comprises a frame 22 having a base 24 which may be in the form of a mechanical head. The frame 22 may comprise a variety of structures coupled with the base 24, but the illustrated embodiment utilizes a plurality of frame bars 26, e.g. four frame bars, connected to the base 24. The frame bars 26 extend from base 24 to a frame bracket 28 which has a longitudinal opening 30 sized to receive the electronics cartridge therethrough, as discussed in greater detail below. In this embodiment, the frame 22 also may comprise a plurality of extension bars 32 coupled to the frame bracket 28. For example, the extension bars 32 may be slidably coupled with frame bracket 28 so as to provide a telescopic frame which may be easily transitioned between an operational, extended configuration, as illustrated in FIG. 1 and a contracted or transport configuration, as illustrated in FIG. 2. In the embodiment illustrated, distal ends of the extension bars 32 are connected to an end bracket 33 which also may have a longitudinal opening therethrough.

As further illustrated in FIG. 1, the tool 20 also may comprise a cartridge adapter 34 which may be selectively coupled to the electronics cartridge, e.g. to an end of the electronics cartridge. In the example illustrated, the tool 20 further comprises a cable system 36 mounted on the frame 22. The cable system 36 has a cable 38 which may be connected with the cartridge adapter 34 so as to move the cartridge adapter 34 in a selected direction when the cable 38 is pulled. Pulling of the cable 38 causes the cartridge adapter 34 to move along the frame 22, e.g. to moved longitudinally along the frame 22, during insertion (or extraction) of the electronics cartridge with respect to the corresponding cartridge housing.

By way of example, the cable 38 may be pulled via a cable winch 40 mounted at a suitable location. For example, the cable winch 40 may be mounted on frame 22 at base 24 or at another suitable location. The cable winch 40 may be an electronic winch, hydraulic winch, or other suitable winch selectively powered to draw in cable 38 during pulling of cable 38 or to release cable 38 following completion of the insertion and/or extraction operation. In the illustrated embodiment, the cable 38 extends from the cable winch 40 and is routed through a plurality of cable returns 42, e.g. pulleys, and back to a retention member 44 of cable system 36. The retention member 44 may comprise a hook, clamp, eye bolt, or other suitable fixture able to attach and secure the cable 38, e.g. an end of cable 38, while cable winch 40 is operated during an insertion or extraction operation.

If frame 22 is constructed as a telescopic frame, the frame 22 may be collapsed to a contracted or transport configuration. For example, the extension bars 32 of frame 22 may be slid through corresponding openings in frame bracket 28 and moved toward base 24, as illustrated in FIG. 2. A release mechanism 46 may be used to secure the extension bars 32 in the extended position illustrated in FIG. 1 and to selectively release the extension bars 32 to enable shifting of frame 22 to the contracted position illustrated in FIG. 2.

By way of example, the release mechanism 46 may comprise a plurality of releases 48 which may be in the form of pins, screws, or other fasteners mounted in frame bracket 28 to enable engagement and release of extension bars 32 of frame 22. The release mechanism 46 effectively transforms frame 22 into a telescopic frame 22 which may be quickly and easily transitioned between, for example, an extended operational configuration and a contracted transport configuration. In some embodiments, the cable 38 may be released from retention member 44 and wound into cable winch 40 (or otherwise stored) when the frame 22 is transitioned to the transport configuration.

In an operational example, a cartridge housing 50 of, for example, a well tool 52 is securely mounted in a vice 54 or other suitable fixture, as illustrated in FIG. 3. Additionally, the insertion tool 20 is coupled with the cartridge housing 50. For example, an end of the cartridge housing 50 may be engaged with frame 22 via insertion into a passage 56 within base 24. In this example, the base 24 comprises an abutment 58 positioned along the passage 56 to limit the extent to which the cartridge housing 50 may be inserted into the base 24 along passage 56. The base 24 and frame 22 may be secured in position with respect to cartridge housing 50 via a variety of engagement techniques, such as the use of couplers 60, e.g. slings, connected between vice 54 and base 24. In some embodiments, however, the base 24 may comprise various grips, clamps, or other devices to secure frame 22 to cartridge housing 50. For example, an integrated vice mechanism may be used to fix insertion tool 20 directly to cartridge housing 50, as described in greater detail below.

Once the frame 22 is secured with respect to cartridge housing 50, an electronics cartridge 62 may be partially inserted into the interior of cartridge housing 50, e.g. partially inserted manually. In this example, the electronics cartridge 62 is an electro-mechanical assembly having electronic components 64, e.g. telemetry, electronics, and power supply components for obtaining logging measurements and/or other desired measurements. The electronics cartridge 62 also may comprise a shock absorber or a plurality of shock absorbers 66, e.g. elastomer shock absorbers. For example, the electronics cartridge 62 may comprise a plurality of shock absorbers 66 in the form of elastomer rings which are compressed and form a seal against an inside surface of the corresponding cartridge housing 50. The elastomer shock absorbers/rings 66 may be used to provide a pressure tight housing when the electronics cartridge 62 is inserted into cartridge housing 50 via tool 20.

Figure 4:
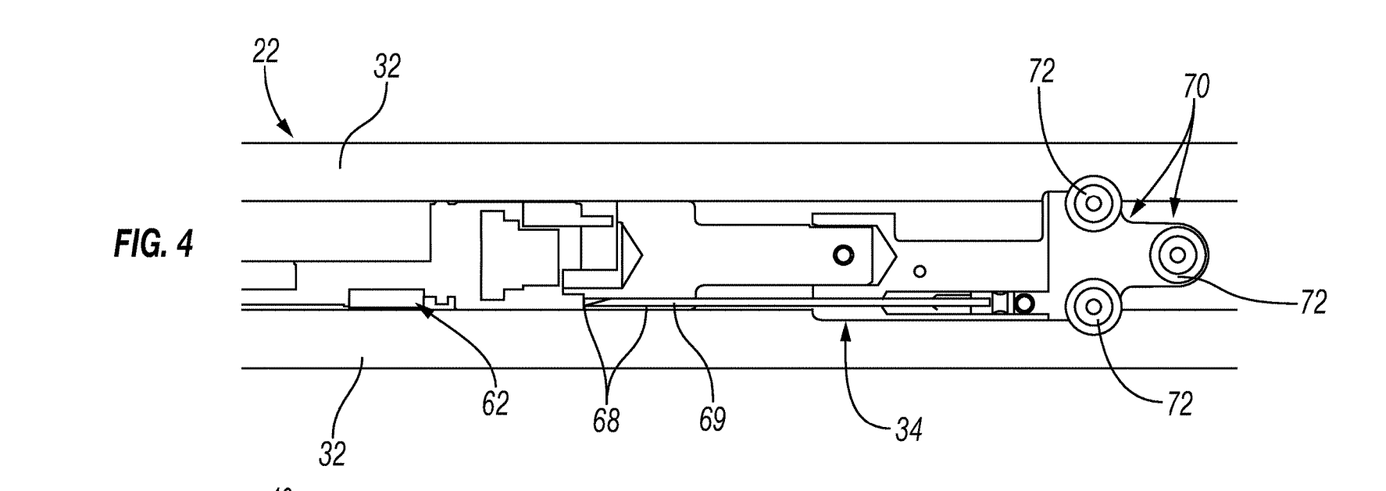
FIG. 4 is an illustration of a portion of the insertion/extraction tool showing an example of a cartridge adapter coupled with the electronics cartridge, according to an embodiment of the disclosure.

As illustrated in the partially broken away view provided in FIG. 3, the frame 22 is transitioned to the extended position and electronics cartridge 62 is positioned within frame 22 through the opening 30 of frame bracket 28. With the electronics cartridge 62 positioned within frame 22 and partially within cartridge housing 50, the cartridge adapter 34 may be engaged with a distal end of the electronics cartridge 62, as illustrated in FIG. 4. The cartridge adapter 34 comprises an engagement feature 68 by which the cartridge adapter 34 is releasably coupled with electronics cartridge 62. The engagement feature 68 may comprise various types of features such as a latch, a threaded coupler, a spring-loaded dog, or other suitable latch mechanism for releasably connecting the cartridge adapter 34 and the electronics cartridge 62. In some embodiments, the engagement feature 68 may comprise a locking feature 69, e.g. a locking tab. Additionally, the engagement feature 68 may be interchangeable with other engagement features 68 to accommodate different types of electronics cartridges 62.

In the embodiment illustrated, the cartridge adapter 34 may further comprise a cable attachment 70 by which the cable 38 is coupled with cartridge adapter 34. By way of example, the cable attachment 70 may comprise a plurality of pins or rollers 72 sized and shaped to engage cable 38. In a specific embodiment, the cable attachment 70 comprises at least one insertion roller 72, e.g. a pair of insertion rollers 72, and at least one extraction roller 72. The cable attachment 70 facilitates connection of cable 38 with the cartridge adapter 34, as illustrated in FIG. 5, to enable the insertion operation.

Figure 5:
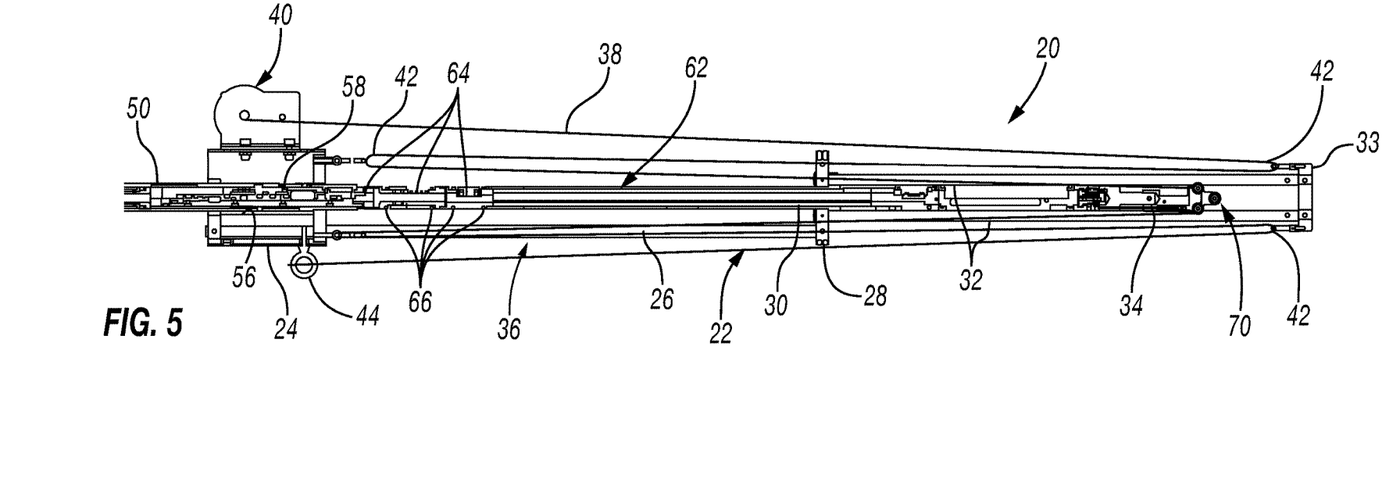
FIG. 5 is a cross-sectional illustration of the insertion/extraction tool being operated to insert the electronics cartridge into the corresponding housing, according to an embodiment of the disclosure.
Figure 6:
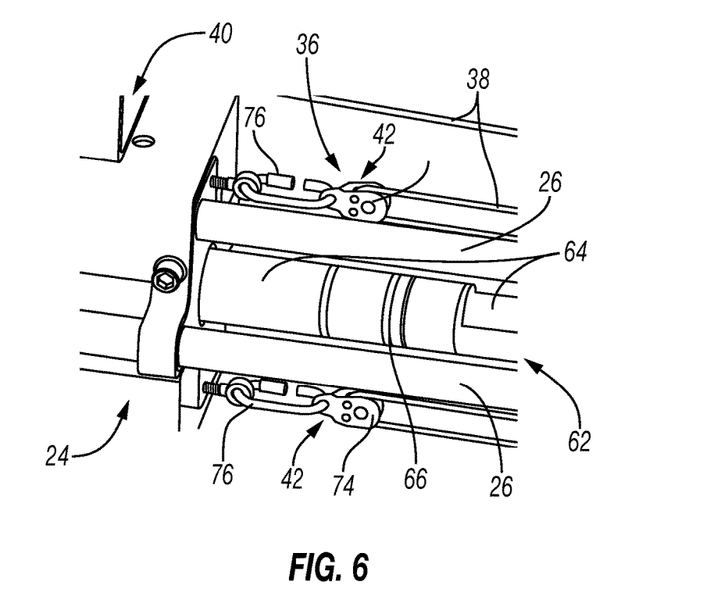
FIG. 6 is an illustration of an enlarged portion of the insertion/extraction tool at the mechanical head or base of the tool, according to an embodiment of the disclosure.

According to the embodiment illustrated in FIG. 5, the cable 38 is extended or unwound from cable winch 40, routed through the appropriate cable returns 42, and coupled with cable attachment 70 of cartridge adapter 34. The free end of cable 38 may be held by retainer mechanism 44 during the insertion operation. In this example, the cable 38 is routed through a pair of cable returns 42 at end bracket 33 and also through a pair of cable returns 42 at base 24, as illustrated in FIG. 6.

Figure 7:
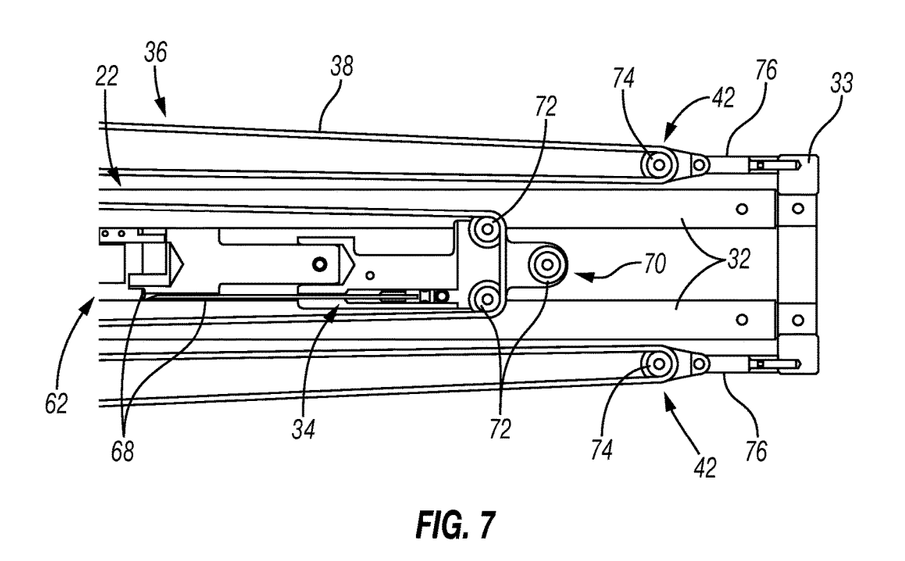
FIG. 7 is an illustration of an enlarged portion of the insertion/extraction tool illustrating the use of a cable in cooperation with the cartridge adapter to insert the electronics cartridge into the corresponding housing, according to an embodiment of the disclosure.

This arrangement allows the cable 38 to be coupled with cable attachment 70 in a manner which provides an axially directed force along the electronics cartridge 62 when cable winch 40 is operated to pull on cable 38 and to wind or draw the cable 38 onto cable winch 40. As illustrated in FIG. 7, a pair of rollers 72 of the cable attachment 70 may be used as insertion rollers which movably capture the cable 38 during the insertion of electronics cartridge 62 into corresponding cartridge housing 50. As illustrated in FIGS. 6 and 7, the cable returns 42 may comprise pulleys 74 coupled to frame 22 at suitable locations via couplers 76. By way of example, each coupler 76 may be in the form of a clevis or other suitable coupler.

Figure 8:
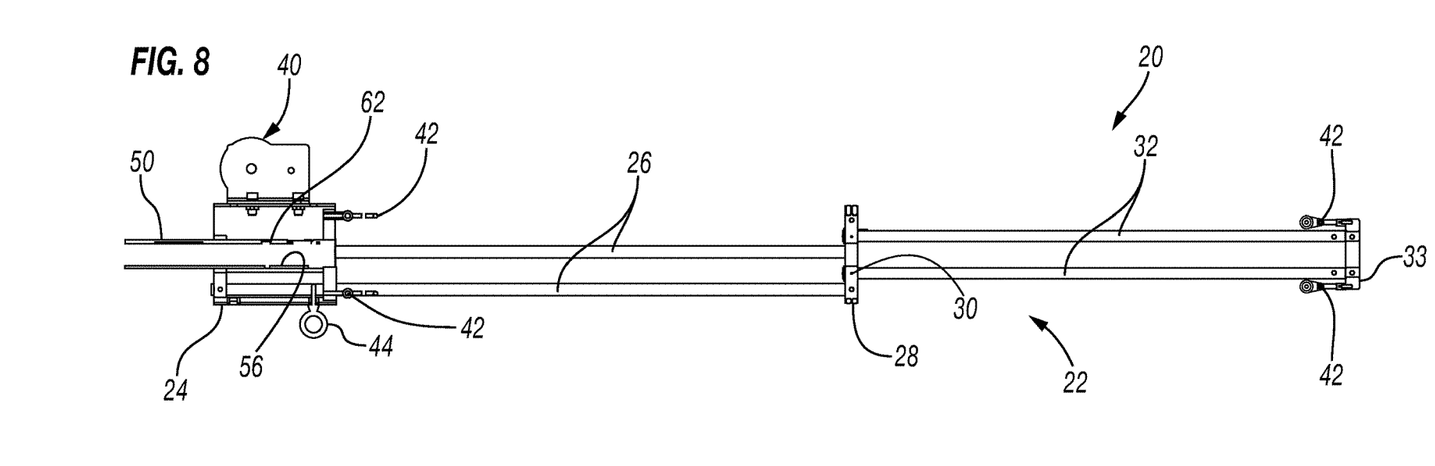
FIG. 8 is a cross-sectional illustration showing the cartridge inserted into the corresponding housing, according to an embodiment of the disclosure.

Once the cartridge adapter 34 is coupled with electronics cartridge 62 and cable 38 is properly routed through cable returns 42 and cable attachment 70, the free end of cable 38 may be secured to, for example, retainer mechanism 44. At this stage, the cable winch 40 may be operated to draw in cable 38. The pulling force on cable 38 and the arrangement of cable 38 through cable returns 42 and cartridge adapter 34 causes an axially directed force on the cartridge adapter 34 and thus on the electronics cartridge 62. This axially directed force overcomes the resistance provided by, for example, shock absorbers 66 and forces the electronics cartridge 62 into the interior of the corresponding cartridge housing 50. The cable winch 40 is continually operated and the cable 38 is continually pulled until the electronics cartridge 62 is inserted to a desired position, e.g. a fully inserted position as illustrated in FIG. 8.

In some embodiments, tool 20 also may be used for extraction of the electronics cartridge 62 from the corresponding cartridge housing 50. For example, some embodiments enable the cable system 36 to be reconfigured so as to apply a generally axial pulling force to the electronics cartridge 62 while cable 38 is pulled by, for example, cable winch 40.

Figure 9:
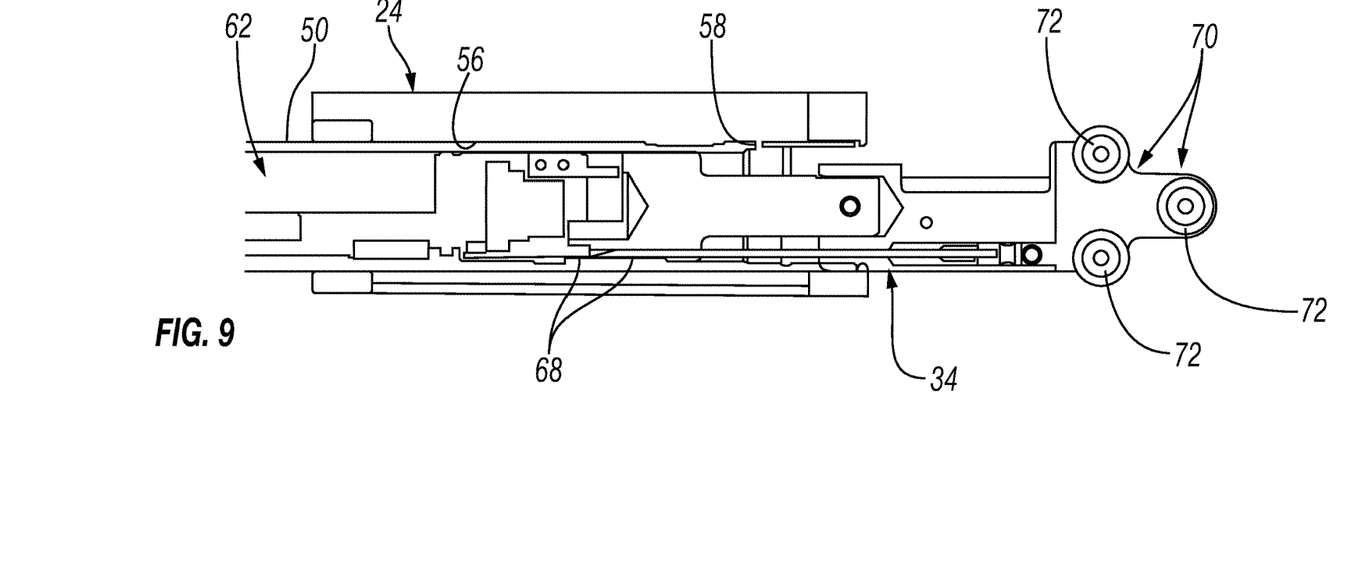
FIG. 9 is an illustration of an enlarged portion of the insertion/extraction tool illustrating the coupling of the cartridge adapter to the electronics cartridge for extraction of the electronics cartridge from the corresponding housing, according to an embodiment of the disclosure.

To extract the electronics cartridge 62, the cartridge adapter 34 is positioned so as to couple the engagement feature 68 with the corresponding end of electronics cartridge 62, as illustrated in FIG. 9. For example, the cartridge adapter 34 may be inserted into the interior of corresponding cartridge housing 50 until engagement feature 68 may be coupled with the corresponding features of electronics cartridge 62. In this extraction example, the cable 38 is again coupled with cable attachment 70 of cartridge adapter 34, as illustrated in FIG. 10.

Figure 10:
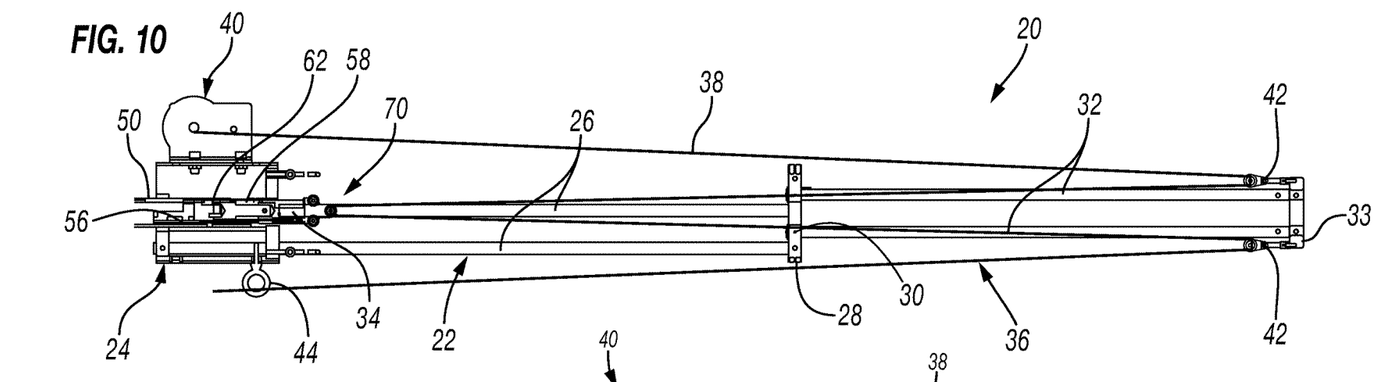
FIG. 10 is a cross-sectional illustration of the insertion/extraction tool being operated to extract the electronics cartridge from the corresponding housing, according to an embodiment of the disclosure.
Figure 11:
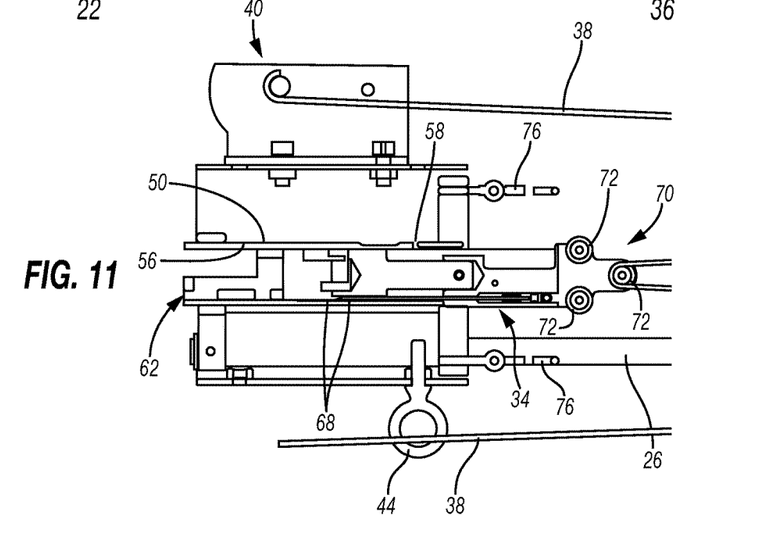
FIG. 11 is an illustration of an enlarged portion of the insertion/extraction tool illustrating the use of a cable in cooperation with the cartridge adapter to extract the electronics cartridge from the corresponding housing, according to an embodiment of the disclosure.

With reference to both FIG. 10 and FIG. 11, the cable 38 may be routed from cable winch 40 and through the cable returns 42 coupled to end bracket 33. Routing of cable 38 through the cable returns 42 proximate base 24 may be omitted so as to enable application of a tensile force on electronics cartridge 62. As illustrated in FIG. 11, the cable 38 may be routed around the extraction roller 72 of cable attachment 70 of cartridge adapter 34 and secured to retention mechanism 44.

When cable winch 40 is operated to pull on cable 38 and to draw in cable 38, the cable 38 effectively applies an axially directed, tensile force on cartridge adapter 34 and thus on electronics cartridge 62. During application of the tensile force, the corresponding cartridge housing 50 is prevented from sliding through base 24 by abutment 58. However, other embodiments may utilize an integrated vice mechanism, as described below, or other features to secure base 24 with respect to housing 50 instead of using abutment 58. Regardless, continued application of sufficient tensile force by cartridge adapter 34 as cable 38 is continually pulled causes extraction of the electronics cartridge 62 from the corresponding cartridge housing 50.

Following extraction of the electronics cartridge 62, the tool 20 may be disconnected from corresponding cartridge housing 50. The end of cable 38 may be released from retention mechanism 44 and wound onto cable winch 40 or otherwise stored. Additionally, the releases 48 may be actuated to release extension bars 32 so that frame 22 may be telescopically contracted for storage or transport.

Figure 12:
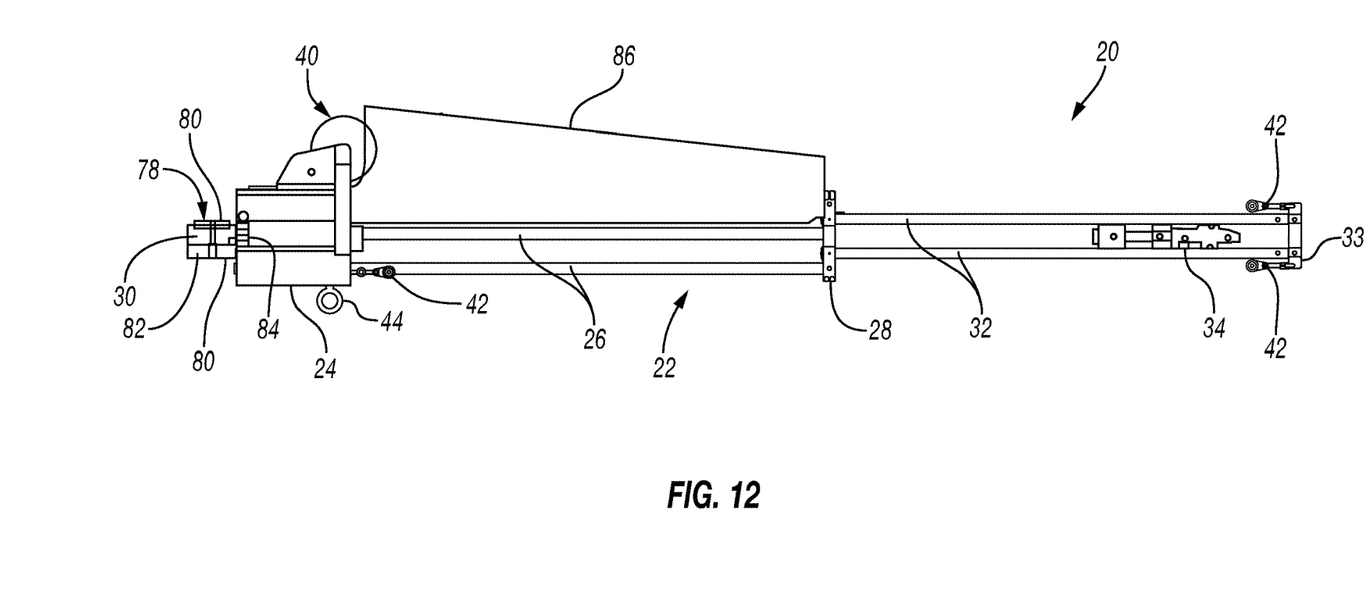
FIG. 12 is an illustration of another example of an insertion/extraction tool, according to an embodiment of the disclosure.
Figure 13:
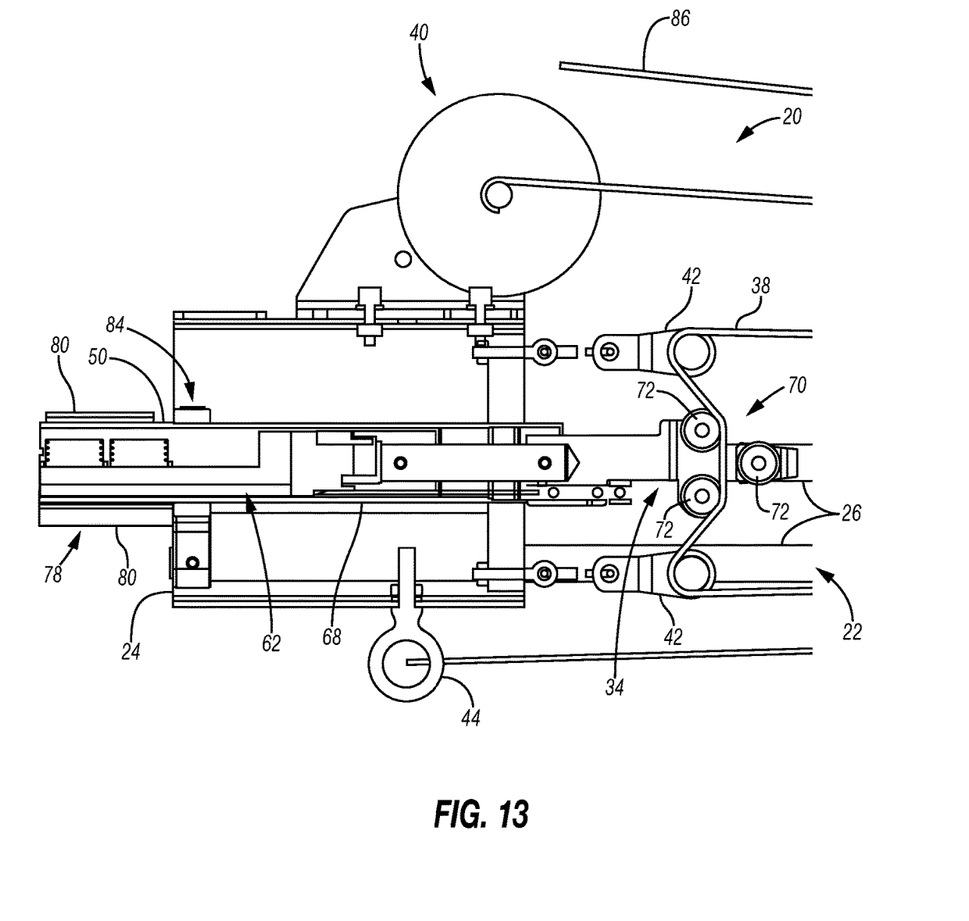
FIG. 13 is an illustration of an enlarged portion of the insertion/extraction tool of FIG. 12 illustrating gripping of a cartridge housing with an integrated vice mechanism, according to an embodiment of the disclosure.

Referring generally to FIGS. 12 and 13, another embodiment of tool 20 is illustrated in which a vice mechanism 78 is used to secure tool 20 to cartridge housing 50. By way of example, the vice mechanism 78 may be an integrated vice mechanism which is integrated with base 24 of tool 20. According to an embodiment, the vice mechanism 78 comprises a clamp fixture or fixtures 80 oriented to engage the exterior of cartridge housing 50, as illustrated in FIG. 12. The clamp fixtures 80 may be tightened against the exterior of cartridge housing 50 via a threaded mechanism 82, e.g. a clamp bolt, or other securing mechanism to ensure tool 20 is secured to cartridge housing 50 during insertion or extraction of electronics cartridge 62.

According to an embodiment, the clamp fixture(s) 80 may be coupled with an engagement feature 84 secured to, for example, base 24 of frame 22, as illustrated in FIG. 13. Depending on the application, the engagement feature 84 may be in the form of a ring secured to base 24. For example, the engagement feature 84 may be in the form of a threaded ring which is threadably engaged with a corresponding threaded receptacle in base 24. However, the engagement feature 84 also may be in the form of a snap ring or other suitable feature by which the clamp fixture or fixtures 80 of the overall vice mechanism 78 is secured to frame 22. The integrated vice mechanism 78 allows tool 20 to be slid onto cartridge housing 50 and secured thereto at a desired location along the cartridge housing 50. In some embodiments, the tool 20 may incorporate a guard mechanism 86 oriented to cover at least a portion of cable 38 during the insertion and/or extraction process.

Depending on the parameters of a given application and/or environment, the structure of the overall insertion/extraction tool 20 may be adjusted. For example, frame 22 may comprise a variety of bars or other structural members working in cooperation with various types of brackets which provide space for the electronics cartridge 62 within or along the frame 22. The frame 22 may be telescopic or otherwise extensible, or the frame 22 may comprise a rigid frame. The overall length and size of the frame 22 also may be selected according to the parameters of a given insertion and/or extraction operation.

Similarly, the frame base 24 as well as the cartridge adapter 34 may be constructed for use with many types of cartridge housings and electronics cartridges. The engagement feature 68 of the cartridge adapter 34 may comprise many types and arrangements of features selected according to the corresponding features available or provided on the corresponding end of the electronics cartridge 62.

The cable system 36 also may comprise various types of cables, cable returns, e.g. pulleys, rollers, pins, and cable retention mechanisms. The pulling force applied to cable 38 may be applied by the cable winch 40 or by other suitable mechanisms able to draw cable 38 in a manner sufficient to insert and/or extract the electronics cartridge. The cable winch 40 or other pulling mechanism also may be selected according to the desired force to be applied to the cable and thus to the electronics cartridge. Additionally, the tool 20 may incorporate various additional features or other features selected according to the parameters of a given operation.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for manipulating an electronics cartridge, comprising:
    a tool for inserting and extracting the electronics cartridge from a corresponding cartridge housing of a well tool, the tool comprising:
    a frame having:
        a base;
        a plurality of frame bars extending from the base to a frame bracket, the frame bracket having an opening sized to receive the electronics cartridge therethrough; and
        a plurality of extension bars coupled to the frame bracket;
    a cartridge adapter for coupling to an end of the electronics cartridge; and
    a cable system mounted on the frame and having a cable connectable to the cartridge adapter so as to move the cartridge adapter in a selected direction along the frame when the cable is pulled, thus causing insertion or extraction of the electronics cartridge with respect to the corresponding cartridge housing;
    wherein the extension bars are slidably mounted to the frame bracket such that they may slide through corresponding openings in the frame bracket relative to the base and the frame bars.

2. The system as recited in claim 1, wherein the cable system comprises the cable routed about a plurality of cable returns mounted to the frame.

3. The system as recited in claim 2, wherein the plurality of cable returns comprises pulleys.

4. The system as recited in claim 2, further comprising a winch, the winch being connected to the cable to enable selective control over winding of the cable on the winch to move the cartridge adapter.

5. The system as recited in claim 4, wherein the winch is mounted to the base.

6. The system as recited in claim 5, wherein the cable extends from the winch, around the plurality of cable returns, and back to a retention member which retains an end of the cable during manipulation of the cartridge adapter.

7. The system as recited in claim 1, wherein the base comprises a passage sized to receive the corresponding cartridge housing.

8. The system as recited in claim 7, wherein the base comprises an abutment positioned along the passage to limit the extent to which the corresponding cartridge housing may be inserted into the base along the passage.

9. The system as recited in claim 7, wherein the tool comprises a vice mechanism to secure the tool with respect to the corresponding cartridge housing.

10. A device for manipulating an electronics cartridge, comprising
    an insertion tool having:
    a frame with a base for receiving a cartridge housing of a well tool;
    a cable winch;
    a cable system mounted on the frame and having a cable extending from the cable winch, through a plurality of cable returns mounted to the frame, and to a retention member which secures the cable; and
    a cartridge adapter connectable to the electronics cartridge and to the cable to enable insertion of the electronics cartridge into the cartridge housing when the cable winch is operated to draw in the cable;
    wherein the frame comprises a plurality of frame bars extending from the base to a frame bracket, the frame bracket having an opening sized to receive the electronics cartridge therethrough, the frame further comprising a plurality of extension bars coupled to the frame bracket;
    wherein the extension bars are slidably received in the frame bracket such that they may slide through corresponding openings in the frame bracket relative to the base and the frame bars.

11. The system as recited in claim 10, wherein the frame is telescopic.

12. The system as recited in claim 10, wherein the cartridge adapter comprises a cable attachment member.

13. The system as recited in claim 10, wherein the cable may be rerouted through selected cable returns to enable extraction of the electronics cartridge from the cartridge housing when the cable winch is operated to draw in the cable.

14. A method for manipulating an electronics cartridge with the device according to claim 10, comprising:
  coupling a cartridge housing with the frame of the insertion tool;
  aligning the electronics cartridge with the cartridge housing;
  engaging the cartridge adapter with the electronics cartridge;
  coupling the cartridge adapter with the cable system; and
  pulling on the cable of the cable system to move the cartridge adapter and to thus insert the electronics cartridge into the cartridge housing.

15. The method as recited in claim 14, further comprising rerouting the cable in the cable system to enable extraction of the electronics cartridge from the cartridge housing by pulling on the cable.

16. The method as recited in claim 14, wherein pulling on the cable causes the cable to move along a plurality of pulleys coupled to the frame.

17. The method as recited in claim 14, wherein pulling on the cable comprises drawing the cable into the cable winch mounted on the frame.

\* \* \* \* \*